United States Patent Office 3,497,301
Patented Feb. 24, 1970

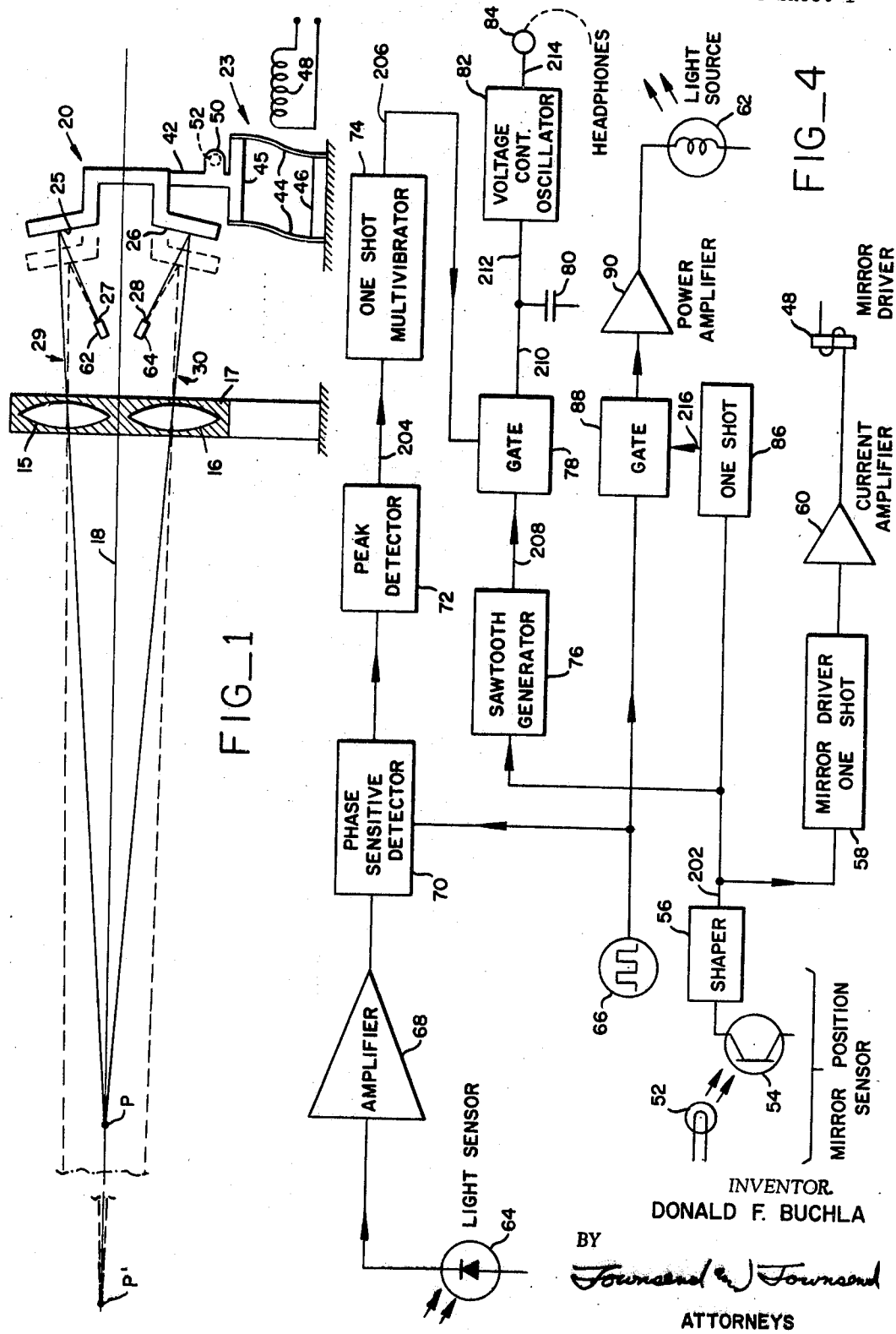

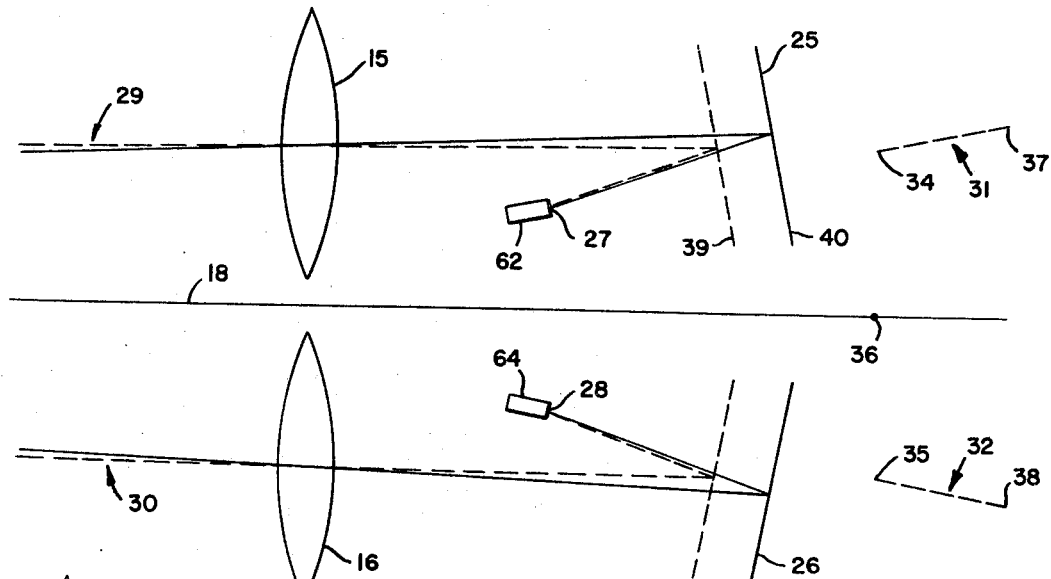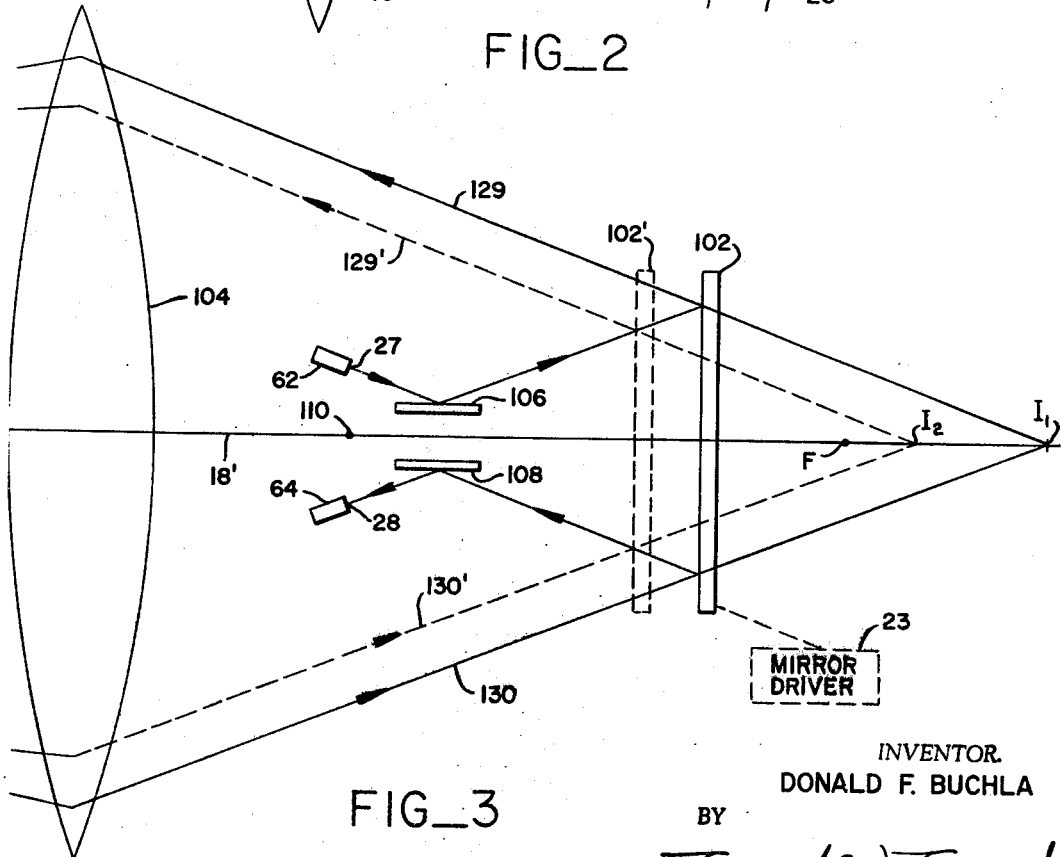

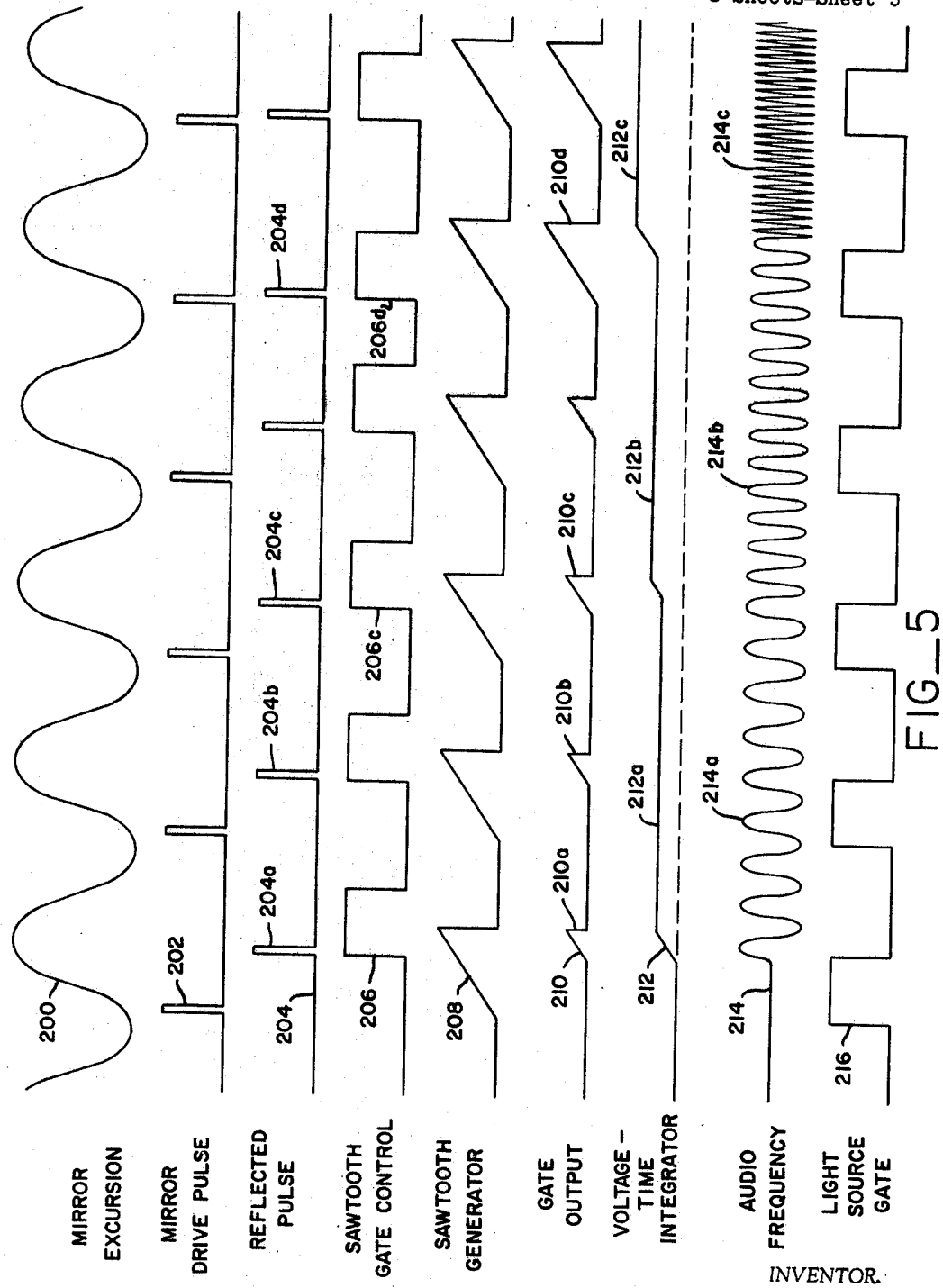
FIG_5

3,497,301
OPTICAL RANGE MEASURING APPARATUS
Donald F. Buchla, Berkeley, Calif., assignor of one-half to General Measurement Research Inc., Berkeley, Calif.
Filed Nov. 8, 1966, Ser. No. 592,782
Int. Cl. G01c 3/08
U.S. Cl. 356—4    8 Claims This invention relates to a distance or range measuring apparatus incorporating optical principles.

One of the principal objects of this invention is to provide a dual optical system formed by two optical paths in which light is projected through one path of the system to a target area and is transmitted by reflection back from the target area to a light sensitive transducer along the second path of the system. The optical paths are established in an optical configuration which will allow the light to be transmitted to the light sensitive transducer only when an object in the target area is disposed at the intersection of the optical paths so that sensing apparatus of the invention provides an indication of range or distance between the device and the target.

Incorporated within the present invention is a mechanism which periodically and simultaneously varies the length of both optical paths throughout a predetermined range within the target area so that the point of intersection of the optical paths is varied sequentially to establish light return from an object within the target area.

Still further incorporated within the present invention is an apparatus wherein the position of elements in the optical system, which position is an analogue of the device-to-target distance, is utilized to give an instantaneous reading of the device-to-target distance.

The device of the present invention has particular application assisting blind persons in judging distances between themselves and an object. In the aforesaid application the device of the invention is arranged to provide an audible output tone having a pitch or frequency proportional to the distance between the device and the sighted target or object.

Another object of this invention is to provide a novel optical system in which the point of convergence of two optical paths is varied by a linearly reciprocating or scanning reflective element in such a fashion that light from fixed points within the device is arranged to travel along optical paths which converge through a range of distances from the device in accordance with the position of the reflective element in its reciprocal scanning movement.

One of the features and advantages of this device lies in the fact that one of the optical paths can employ a light at the fixed point and the other a light-sensitive transducer at the fixed point in such a way that the transducer will be energized only by light return from an object coinciding with the point of convergence of the optical paths. By use of the aforesaid device the linear scan of the reflective device can sequentially move the point of convergence or light return throughout a wide range; thus the position of the reflective device is a direct analogue of the distance from the device at which light will be returned at the point of convergence.

Still another object of the invention is to provide a sensing apparatus which is sensitive to the excursion of the reflective element or mirrors to generate an electrical signal having an instantaneous output which is an analogue of the instantaneous position of the mirror at each point throughout its excursion. The output signal thus generated from the light sensitive transducer is thereby a direct analogue of the distance between the device and a target object from which light from the light source is returned to the transducer.

Yet another object of the present invention is to provide an optical measuring device in which light is projected from the device in such a way as to be returned to a light-sensitive transducer carried by the device only when a light reflecting object is at a predetermined distance from the device and to further provide means whereby the aforesaid predetermined distance can pass through a periodic excursion of values.

A further object of the invention is to provide a simple apparatus whereby a mirror or like reflective element can be moved in a non-rotative reciprocal path in order to obtain the requisite excursion of the optical sensing distance over a target area.

A still further object of this invention is to provide apparatus including a light source which has a predetermined unique characteristic and a light receiving system that is sensitive only to light having the same unique characteristic, so that the device is unaffected by normal ambient light and is sensitive in its response only to light returned to the transducer which first emanates from the distance measuring device itself. The aforesaid has the feature and advantage of avoiding ambiguities and errors which could result from reception of ambient light reflected from a target surface.

Other objects, features and advantages of the present invention will be more apparent after referring to the following specification and accompanying drawings in which:

FIG. 1 is a schematic view of the apparatus forming the optical system of the present invention;

FIG. 2 is a diagrammatic view showing the light trajectory at enlarged scale in a device incorporating the apparatus as shown in FIG. 1;

FIG. 3 is a schematic view of an alternative embodiment of the distance measuring apparatus;

FIG. 4 is a block diagram of exemplary circuitry employed for producing a tone having a frequency proportional to the distance of a cited object from the apparatus; and FIG. 5 is a timing chart indicating the time sequence of events occurring in the circuit of FIG. 4.

In the drawings and with particular reference to FIG. 1 there is provided a range finding device according to the invention, having a pair of objective lenses 15 and 16 mounted on a common plane at 17 and disposed symmetrical of and normal to an optical axis or target line 18. Immediately behind the lenses there is provided a mirror system 20 which is arranged to move reciprocally along a line parallel with optical axis 18 through a mirror moving mechanism indicated at 23. The mirror mechanism is provided with a pair of reflective or mirror surfaces 25 and 26 which are disposed symmetrically of optical axis 18 at an angle so as to reflect light from lenses 15 and 16, respectively, to fixed points 27 and 28 located within the range finding device intermediate lenses 15 and 16 and mirrors 25 and 26. The fixed points 27 and 28 are disposed at the same distance from the respective lenses 15 and 16 and are spaced symmetrically of optical axis 18. Any suitable opaque shield, not shown, is interposed between fixed points 27 and 28 so that light communication between them occurs only through lenses 15 and 16 and mirror surfaces 25 and 26. Mirrors 25 and 26 are mounted at an angle to direct light from a point along the optical axis in front of lenses 15 and 16 so that light at one point P along the target line 18 will be directed to both fixed points 27 and 28.

For convenience of description the line along which light travels from point P through lens 15 to mirror 25 for reflection to fixed point 27 will be referred to as optical path 29; the line along which light travels from point P through lens 16 to mirror 26 for reflection to fixed point 28 will be referred to as optical path 30.

As previously stated, the mirror apparatus 20 is reciprocally movable through an excursion path which is parallel and in axial alignment with the target line to effectively vary the position of point P along the target line at which light will be reflected from the respective mirrors 25 and 26 to the two fixed points 27 and 28, respectively. The angle of the mirrors 25 and 26 is determined as shown in FIG. 2 whereat it can be seen that light anywhere along the target line 18 will be focused along imaginary paths indicated by broken lines 31 and 32 for lenses 15 and 16, respectively. Thus, an object in front of the lenses at infinity would image at 34 from lens 15 and at 35 from lens 16. The points 34 and 35 are the same distance behind the plane of lenses 15 and 16 as the focal point 36 of the optical system constituted by the lenses. A closer object would image at 37 for lens 15 and at 38 for lens 16. The two fixed points 27 and 28 and the angle of mirrors 25 and 26 are positioned so that the virtual images of the fixed points in the respective mirrors are formed along lines 31 and 32 respectively as the mirrors are reciprocated in unison axially of and parallel with target line 18. Thus, moving mirrors 25 and 26 to a position closer to lenses 15 and 16, as indicated by broken lines 39, will cause objects appearing at a most distant point P' which would normally be imaged proximate points 34 and 35 to be reflected to the two fixed points 27 and 28. At the opposite end of the excursion indicated by broken lines 40 light from a closer object which would normally be imaged at points 37 and 38 is reflected to the fixed points 27 and 28. Thus, intermediate points between limits of excursion between 39 and 40 will similarly reflect light to points 27 and 28 from objects appearing intermediate of the far and the near points P', P which would normally fall upon imaginary lines 31 and 32.

The optical system constituted by lenses 15 and 16 and the position of fixed points 27 and 28 and mirrors 25 and 26 with respect to the lenses combine to afford a system in which a relatively small excursion of mirror surfaces 25 and 26 effects a relatively large excursion of the point of intersection P of optical paths 29, 30 on optical axis 18. Contributing to the relatively small amount of mirror excursion necessary for a large excursion of the target sweep path is the fact that the optical effect produced by the mirror excursion is twice that of the actual mirror excursion since the length of both incident and reflective paths are changed as the mirror position changes. In one system constructed according to this invention a sweep range of one foot (P) to ten feet (P') in front of lenses 15 and 16 was effected by movement of mirrors 25 and 26 by approximately .250 inch.

A satisfactory apparatus for reciprocally driving mirror surfaces 25 and 26 is shown schematically in FIG. 1 at 23. Mirror driving mechanism 23 includes a mirror mounting member 42 carried for linear oscillatory movement on a rigid bar 45 that is secured onto the free ends of a pair of leaf springs 44, the lower ends of which are mounted on a fixed base 46. Springs 44 are identical so that the angle between the mirror surfaces and optical axis 18 remains constant for all positions of such mirror surfaces. Springs 44, when in a relaxed or unstressed condition, tend to position mirror structure 20 midway between the extremes of excursion indicated at 39 and 40. For effecting oscillatory or sweeping movement of the mirror structure, an electro-magnetic coil 48 is mounted adjacent the mirror structure so that the mirror structure will move toward the coil when the coil is energized. In the examplary apparatus of FIG. 1 the mirror structure is moved rearwardly or away from lenses 15 and 16 in response to energization of coil 48. Rearward movement of the mirrors causes the point of intersection of optical axes 29 and 30 to scan from a remote point P' to a near point P. When coil 48 is deenergized, springs 44 causes the mirrors to move forwardly or toward lenses 15 and 16. The mirror moving structure 23 includes an opaque member 50 which interrupts a beam from a light source 52 when the mirror surfaces are at the rearward extremity of their excursion so as to interrupt current flow to coil 48.

Referring to FIG. 4, light source 52 is in light communication iwth a light sensitive element such as phototransistor 54 except when such communication is interrupted by interposition of opaque member 50 between the light source and the sensor. The output of phototransistor 54 is fed to a shaper circuit 56, a conventional circuit element that converts the irregular phototransistor output to a square pulse. The square pulse output of shaper 56 is connected to a one-shot or monostable multivibrator 58, which is a conventional device that produces an output pulse of relatively long constant duration when triggered at its input by the relatively short pulse from shaper 56. The output of multivibrator 58 is amplified by a current amplifier 60 and applied to the coil of solenoid 48. Thus it will be seen that mirror surfaces 25 and 26 are driven forwardly by energy stored in springs 44 when the light path between lamp 52 and phototransistor 54 is interrupted by opaque member 50. Such interruption occurs when the mirror moving mechanism 23 reaches its rearward most position in response to the force produced by coil 48. The amount and frequency of oscillatory movement imparted to mirror surfaces 25 and 26 are proportional to the duration of the pulse initiated by multivibrator 58 and to the physical characteristics of springs 44 and the mass of the mirror structure. Reference is made to FIG. 5 in which reference numeral 200 designates a plot of mirror excursion in which time is plotted on the abscissa and mirror position is plotted on the ordinate. Reference numeral 202 indicates the output of shaper 56 in which a pulse is established each time opaque member 50 interrupts the light beam from lamp 52 to phototransistor 54.

For illuminating the point P of intersection of optical paths 29 and 30 on optical axis 18, a suitable light source 62 is mounted at fixed point 27 for directing a light beam to mirror surface 25 for reflection through lens 15 to a point along optical axis 18 in front of the lens system. A light sensor 64 is disposed at fixed point 28 and is oriented to receive light reflected by an object on optical axis 18 which light is focused by lens 16 and reflected to the object by mirror surface 26. If the intensity of the light focused on an object along optical axis 18 from light source 62 exceeds the intensity of ambient light, light sensor 64 will respond when the point of intersection of the optical paths coincides with the position of an object along optical axis 18. Under such conditions light source 62 can be any conventional incandescent source and light sensor 64 can be any suitable photo detector. In order to insure utility of the apparatus in environments of high light intensity, light source 62 is adapted to radiate optical energy having discrete properties and light sensor 64 is adapted to respond only to light having such discrete properties.

The circuit of FIG. 4 exemplifies one satisfactory technique for imparting to the light such discrete properties. Light source 62 is chopped, i.e., pulsed on and off repetitively, at a rate large with respect to the frequency of reciprocation or oscillation of the reflective mirror surfaces 25 and 26, in response to a square wave generator 66. In one apparatus designed according to the present invention square wave generator 66 produces pulses at a repetition rate of 33 kc./second. The electrical output of light sensor 64 is amplified by a frequency sensitive band pass amplifier 68 which is adapted for selective amplification of signals varying at the same frequency as that produced by square wave generator 66. Consequently, the electrical output of amplifier 68 varies in proportion to light from source 62 reflected by an object along the optical axis to the exclusion of spurious ambient light. A phase sensitive detector 70, to which the output of amplifier 68 is fed, affords further discrimination against spurious ambient light radiated to sensor 64. Phase sensitive detector 70 is a conventional circuit element employing a gate circuit controlled by square wave generator 66 that passes the signal from amplifier 68 in synchronization with the square wave generator output. Thus the output of phase sensitive detector 70 is a series of pulses occurring at the same frequency as square wave generator 66 and having an amplitude proportional to the intensity of light reflected from an object on the optical axis. Such output is fed to a peak voltage detector 72 which passes signals above a preselected amplitude and forms the time integral of such pulses for generating a trigger signal 204 (FIG. 5) for a one-shot monostable multivibrator 74. The one-shot multivibrator is a well known circuit element and has the characteristic of generating at its output 206 a single voltage pulse of relatively long and constant duration when energized at the input thereof. The leading edge of the pulse from multivibrator 74 will thus be seen to occur at a time proportional to the distance from the apparatus at which an optical axis 18 reflects light from light source 62 to light sensor 64.

The present invention includes elements for converting such time relationship of the output of multivibrator 74 to a signal discernible by a user of the apparatus. For this purpose a sawtooth generator 76 is provided and is connected to the output of shaper 56 so that each time the shaper produces a pulse to initiate movement of the mirror surfaces the sawtooth generator produces a sawtooth pulse, the amplitude of which increases in proportion to the displacement of the mirrors in response to solenoid 48. The output 208 of the sawtooth generator is plotted in FIG. 5. The sawtooth wave is connected to the input of an AND gate 78, to which input is also connected the output 206 of multivibrator 74. Thus as shown at 210 in FIG. 5 the time integral of the output of gate 78 is proportional to the position of mirror surfaces 25 and 26 with respect to lenses 15 and 16, which distance is in turn proportional to the distance from the lenses to an object in front of the lenses on optical axis 18 when such object reflects light from source 62 back to sensor 64. The output of gate 78 is integrated with respect to time by a capacitor 80 and the integrated signal 212 (FIG. 5) is connected to the input of a voltage controlled audio oscillator 82. Oscillator 82 is a conventional circuit element which produces an audio signal having a frequency output proportional to the level of the voltage applied to its input. An electro-acoustic transducer 84 converts the audio frequency signal to a sound signal audible to the user of the device. The audio frequency output is graphically illustrated at 214 in FIG. 5.

In order to avoid ambiguous signals an object on optical axis 18 is sensed during only one direction of movement of mirrors 25 and 26. To effect such mode of operation an input terminal of a one-shot multivibrator 86 is connected to the output of shaper 56, as a consequence of which the multivibrator is triggered each time the mirror structure is driven toward the lens system. Multivibrator 86 is designed so that the duration of the output pulse produced thereby is approximately equal to or slightly shorter than the time required for the mirrors to move from the rearward extremity 40 to the forward extremity 39. Such output pulse is shown at 216 in FIG 5. The output pulse is used to open an AND gate 88 which gates the output of square wave generator 66 to light source 62 through a suitable power amplifier 90. It will thus be seen that light source 62 produces light only during the forward movement of mirrors 25 and 26 and not during the return movement of the mirrors.

In operation, if it be assumed that a user of the apparatus is approaching an object, the object will be sensed initially at a relatively far distance from the apparatus and the peak detector 72 will produce a pulse 204a (FIG. 3). Through multivibrator 74, gate 78 is turned on relatively late with respect to triggering of sawtooth generator 76 so that a relatively small voltage signal 210a is applied to capacitor 80. Consequently a relatively low voltage level 212a is stored in the capacitor and the audio output of oscillator 82 will be at a relatively low frequency 214a. So long as the distance between the apparatus and the object remains constant the charge on the capacitor will be maintained constant by subsequent pulses 204b and 210b. If the distance between the apparatus and the object decreases, the time relationship of the light striking sensor 64 will change, and a pulse such as 204c will turn on gate 78 earlier by the earlier occurrence of a pulse 206a from multivibrator 74. Because of the foregoing, a greater portion of the sawtooth wave 208 is passed through gate 78 as shown at 210c and capacitor 80 is charged to a higher voltage level 212b. Thus, the output frequency 214b of oscillator 82 increases, indicating to the user of the device that the distance between the device and the object is closing. The voltage level applied to the oscillator 82 is maintained constant for so long as the distance to the object remains constant.

When the object is very near the apparatus, a light signal is reflected by the object from light source 62 to light sensor 64 at a time when mirror surfaces 25 and 26 are very near their rearward or starting position. Reference numeral 204d indicates the output pulse of peak detector 72 resulting from a very near object. Consequently multivibrator 74 is pulsed very early as at 206d and substantially all of sawtooth wave 208 is passed through gate 78 as shown at 210d. Accordingly, the charge on capacitor 80 is further increased to a level indicated at 212c and the frequency output of oscillator 82 is correspondingly increased as at 214c.

The above described technique for imparting discrete properties to the light energy generated by source 62 (i.e., chopping the light at a fixed frequency) is merely exemplary. Other techniques, which will occur to those skilled in the art, include the use of laser light at a single preselected wave length and/or light in the infrared portion of the spectrum. Suitable filters and/or circuit elements are employed in connection with light sensor 64 to discriminate against all light energy except that having the discrete properties of light source 62. The foregoing alternatives are well within the competence of a skilled artisan and therefore need not be more fully explained here.

An alternate optical system within the present invention is shown schematically in FIG. 3 wherein a planar mirror surface 102 is reciprocally driven by mirror-moving mechanism 23. Mirror surface 102 is supported behind a single lens 104 having an optical axis 18'. The mirror surface is oriented perpendicular to optical axis 18' and is maintained in such orientation throughout the entire excursion of the mirror caused by mirror-moving mechanism 23. Fixed points 27 and 28 are disposed as described above in connection with FIGS. 1 and 2, and intermediate the fixed points and mirror surface 102 are auxiliary mirror surfaces 106 and 108, which auxiliary mirror surfaces are positioned so that the virtual image 110 of fixed points 27 and 28 are reflected by the mirrors through lens 104. As explained in more detail hereinabove a light source 62 is mounted at fixed point 27 and oriented to project light onto auxiliary mirror surface 106; a light sensor 64 is mounted at fixed point 28 and is oriented to receive light projected from auxiliary mirror surface 108. With mirror surface 102 in the position shown in solid lines in FIG. 3, light from fixed points 27 and 28 will be reflected along optical paths 129 and 130 respectively through lens 104 for intersection at a point in front of the lens on optical axis 18' relatively close to the apparatus. If it be assumed that the focal point of lens 104 is at F, the virtual image of fixed points 27 and 28 formed by mirror 102 will be positioned at $I_1$ so that the point of intersection of the optical paths will be relatively near the apparatus.

When mirror 102 is at a forward position in its excursion, indicated at 102', the virtual image of fixed points 27 and 28 will lie at I₂ as a consequence of which the point of intersection of optical paths 129' and 230' will be formed on optical axis 18' in front of lenn 104 relatively far from the apparatus. It will be apparent that as mirror 102 is scanned from the position indicated at 102 to the position indicated at 102' the point of intersection of the optical paths in front of lens 104 will be correspondingly scanned. The provision of circuit components for converting the instantaneous position of mirror 102 at which an object on axis 18' reflects light from source 62 to sensor 64 is accomplished in an identical manner as described above in connection with FIGS. 4 and 5.

The optical system of FIG. 3 has the advantage referred to hereinabove in respect to FIG. 2 of providing a relatively wide range scan in the target area in front of lens 104 for a relatively small excursion of mirror 102. Moreover, the provision of coplanar mirror surfaces, such as 102 is somewhat less complex than the provision of dual mirror surfaces 25 and 26 of the apparatus of FIG. 2. Otherwise the two systems are quite similar in construction and operation.

In one apparatus designed according to FIG. 3 mirror surface 102 was driven sinusoidally by a conventional loudspeaker voice coil structure at a frequency of about 50–100 cycles per second, the resonant frequency of the mirror and voice coil mass. In an optical system having a focal length of approximately 2¾ inches, a target area range of 1–10 feet was accomplished by an excursion of the mirror 102 of less than ¼ inch. The audio tone generated by oscillator 82 varied from a low-pitched growl at 10 feet to a 3 kc. signal at 1 foot. It was found that the apparatus had sufficient sensitivity to detect objects having a reflectivity as low as .02. In the exemplary system the lens system was arranged so that the field of view of the device is about 10 milliradians or .57 degrees. Such apparatus weighs approximately 3 lbs. and is therefore highly portable. Because a discrete property was imparted to the light produced by source 62 and received by sensor 64, the apparatus is substantially unaffected by ambient light conditions.

Thus, it will be seen that the present invention provides a distance measuring system utilizing optical energy as opposed to radio frequency energy which is highly accurate, provides a reasonably wide operating range, is highly portable, and is substantially unaffected by ambient light conditions or the reflectivity of objects sensed by it. Since the range scanning of the system is accomplished by a mirror oscillating over a relatively small excursion, the apparatus can be constructed in a lightweight and inexpensive form. Although an audio signal of changing frequency has been disclosed as the output signal for the device, other techniques for gleaning distance information from the apparatus will occur to those skilled in the art.

Although two embodiments of the invention have been shown and described, it will be obvious that other adaptations and modifications can be made without departing from the true spirit and scope of the invention.

What is claimed is:

1. Apparatus for measuring the range of an optically reflective object comprising a light source, a light sensor mounted in fixed space relation to said light source, a lens system mounted in fixed spaced relation to said light source and said light sensor, means including a first mirror surface for establishing a first optical path from said light source to said lens, means including a second mirror surface for establishing a second optical path from said light sensor to said lens, said lens being adapted to effect convergence of said paths, means for reciprocally driving said mirror surfaces in unison toward and away from said lens so that the point of convergence of said light paths is moved away from and toward said lens, and means responsive to excitation of said light sensor by light on said second optical path for generating a signal proportional to the reciprocal position of said mirror surfaces.

2. Apparatus according to claim 1 including means for supporting said first and second mirror surfaces in coplanar relationship in a plane perpendicular to the direction of reciprocal movement thereof.

3. Range measuring apparatus comprising a lens system having an optical axis, a light source and a light sensor mounted in fixed spaced relation symmetrically of said optical axis, means for reflecting light from said source to said lens along a first optical path, means for reflecting light from said lens to said light sensor along a second optical path, said lens being adapted to converge said paths at a point on said optical axis, means for reciprocally driving said reflecting means in unison toward and away from said lens in a direction parallel with said optical axis to reciprocate the point of path convergence along said optical axis away from and toward said lens, and means responsive to excitation of said light sensor for generating a signal proportional to the position of said reflecting means along said optical axis.

4. Apparatus according to claim 3 wherein said signal generating means comprises means for forming a pulse each time said reciprocally driving means drives said reflecting means through a preselected point in the excursion thereof, means for forming a pulse each time said light sensor is excited by light from said light source reflected from an object on said optical axis, and means for generating an audible signal having a frequency proportional to the time between formation of said pulses.

5. Apparatus for measuring the range of an optically reefictive object comprising a lens system having an optical axis and first and second sides formed so that light paths originating on said first side will converge to intersect said optical axis on said second side, a light source, means including a first mirror surface for reflecting light from said source to the first side of said lens, a light sensor, means including a second mirror surface for reflecting light from said first lens side to said light sensor, means for mounting said mirror surfaces so that the images of said source and said sensor coincide on the optical axis on the second side of said lens, means for moving said mirror surfaces in unison so that the point of coincidence of the images is moved along the optical axis toward and away from said second lens side, and means responsive to excitation of said sensor by light from said source reflecting from an object in said optical path for generating a signal proportional to the distance from said first lens side of said mirror surface at the time of reflection.

6. Apparatus according to claim 5 wherein said signal generating means comprises means for generating a voltage signal that varies in magnitude in proportion to the position of said mirror moving means, means for generating a pulse on excitation of said light sensor by light reflected from an object on the optical axis, means for deriving a voltage proportional to the phase relationship between said pulse and said varying voltage signal, and output means for manifesting the magnitude of the voltage derived by said deriving means.

7. Apparatus according to claim 5 in combination with means for imparting a property to light from said light source discrete from ambient light and means sensitive to only such discrete property for discriminating against ambient light so that said signal generating means is active only when said sensor is excited by light having such discrete property.

8. Apparatus for measuring the range of an optically reflective object comprising a lens system having an optical axis and a focal point on said axis, a light source mounted intermediate said lens system and said focal point, said light source being spaced laterally of said optical axis, a light sensor mounted intermediate said lens system and said focal point, said light sensor being spaced laterally of said optical axis symmetrically of said light source, a first mirror surface disposed intermediate said source and said focal point for reflecting light from said source to said lens system, a second mirror surface intermediate said sensor and said focal point for reflecting light from said lens to said sensor, said mirror surfaces being disposed so that the virtual image of said source and said sensor produced by said mirror surfaces are positioned equidistantly from said lens system and symmetrically of said optical axis, means for reciprocally moving said mirror surfaces in unison in a direction parallel to said optical axis so that the virtual images of said source and sensor move between two positions on the side of said focal point remote from said lens system, and means for generating a signal when an object on said optical axis illuminated by said source reflects light to said sensor which signal has a magnitude proportional to the position of said virtual images relative the focal point.

References Cited

UNITED STATES PATENTS 3,218,909   11/1965   Fain _____ 356—4
3,266,365   8/1966    Stauis _____ 356—4

RODNEY D. BENNETT, JR., Primary Examiner

J. P. MORRIS, Assistant Examiner